(12) United States Patent
Haff et al.

(10) Patent No.: US 11,603,054 B2
(45) Date of Patent: Mar. 14, 2023

(54) COMPONENT ARRANGEMENT WITH A LINE THAT HAS RIGID AND FLEXIBLE SECTIONS

(71) Applicant: Bayerische Motoren Werke Aktiengesellschaft, Munich (DE)

(72) Inventors: Oliver Haff, Munich (DE); Christian Hipf-Buffi, Dachau (DE); Jan Mueller-Brincken, Munich (DE); Martin Schuster, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 16 days.

(21) Appl. No.: 17/267,431

(22) PCT Filed: Jul. 18, 2019

(86) PCT No.: PCT/EP2019/069406
§ 371 (c)(1),
(2) Date: Feb. 9, 2021

(87) PCT Pub. No.: WO2020/030400
PCT Pub. Date: Feb. 13, 2020

(65) Prior Publication Data
US 2021/0323491 A1 Oct. 21, 2021

(30) Foreign Application Priority Data
Aug. 10, 2018 (DE) .................... 10 2018 213 518.5

(51) Int. Cl.
*B60R 16/02* (2006.01)
*B60R 16/033* (2006.01)
*F16F 1/373* (2006.01)

(52) U.S. Cl.
CPC ........ *B60R 16/0222* (2013.01); *B60R 16/033* (2013.01); *F16F 1/3732* (2013.01)

(58) Field of Classification Search
None
See application file for complete search history.

(56) References Cited

U.S. PATENT DOCUMENTS 2,649,516 A * 8/1953 Wojcik ................ B60R 25/1006
200/61.93
3,455,595 A 7/1969 Wessells et al.
(Continued)

FOREIGN PATENT DOCUMENTS

CA 2063253 A1 * 1/1991
CN 108431904 A * 8/2018 ......... B60R 16/0207
(Continued)

OTHER PUBLICATIONS

PCT/EP2019/069406, International Search Report dated Oct. 23, 2019 (Two (2) pages).
(Continued)

*Primary Examiner* — Timothy J. Dole
*Assistant Examiner* — Muhammed Azam
(74) *Attorney, Agent, or Firm* — Crowell & Moring LLP

(57) ABSTRACT

A line arrangement for assembly, for at least partial insertion inside a component and/or for guiding through the inside of a component, particularly a chamber of a bodywork component of a vehicle, includes at least one line which is designed in a non-rigid manner with a plurality of rigid segments and with flexible connection elements that connect to the rigid segments.

4 Claims, 2 Drawing Sheets

(56) References Cited

U.S. PATENT DOCUMENTS

| | | | | |
|---|---|---|---|---|
| 4,518,196 A | * | 5/1985 | Forster | B62D 31/02 244/119 |
| 4,830,457 A | * | 5/1989 | Asada | G02B 6/444 174/70 R |
| 5,291,000 A | * | 3/1994 | Hornberger | H05B 3/20 219/532 |
| 8,550,842 B1 | * | 10/2013 | Gutierrez | H01R 13/5216 439/604 |
| 9,469,432 B2 | * | 10/2016 | Aguirre | B65D 5/0015 |
| 9,757,889 B2 | * | 9/2017 | Griffin | B29C 48/157 |
| 9,788,447 B2 | * | 10/2017 | Dalton | F01D 21/045 |
| 10,251,270 B2 | * | 4/2019 | Xiong | H05K 1/115 |
| 10,938,197 B2 | * | 3/2021 | Yanazawa | H02G 3/22 |
| 2002/0096352 A1 | * | 7/2002 | Kuwayama | H01R 4/20 174/74 R |
| 2002/0117321 A1 | * | 8/2002 | Beebe | B60R 16/0215 174/72 A |
| 2003/0088144 A1 | * | 5/2003 | Terwilliger | A61N 5/1027 600/8 |
| 2003/0092958 A1 | * | 5/2003 | Terwilliger | G21G 4/08 600/8 |
| 2007/0148994 A1 | * | 6/2007 | Sato | B60R 16/0215 439/34 |
| 2013/0000974 A1 | * | 1/2013 | Igarashi | H02G 3/0487 156/60 |
| 2014/0291016 A1 | * | 10/2014 | Kajiwara | H01B 9/00 174/70 R |
| 2015/0047188 A1 | * | 2/2015 | Thomas | H05K 3/427 29/852 |
| 2015/0136445 A1 | * | 5/2015 | Griffin | B29C 48/157 174/169 |
| 2016/0101747 A1 | * | 4/2016 | Inao | H02G 3/0418 174/72 A |
| 2016/0163422 A1 | * | 6/2016 | Sugimoto | B60R 16/0215 174/72 A |
| 2016/0276064 A1 | * | 9/2016 | Suguro | B60R 16/0207 |
| 2017/0194929 A1 | * | 7/2017 | Kochetov | H03H 7/06 |
| 2018/0118137 A1 | * | 5/2018 | Tsukamoto | H01R 12/515 |
| 2018/0118138 A1 | * | 5/2018 | Tsukamoto | H01B 7/0045 |
| 2019/0023199 A1 | * | 1/2019 | Nakai | H02M 7/003 |
| 2019/0244728 A1 | * | 8/2019 | Takata | H01B 13/01254 |
| 2019/0279790 A1 | * | 9/2019 | Ito | H01B 7/009 |
| 2019/0283807 A1 | * | 9/2019 | Bremmer | B62D 21/17 |
| 2020/0198558 A1 | * | 6/2020 | Adachi | B60R 16/0215 |

FOREIGN PATENT DOCUMENTS

| | | | |
|---|---|---|---|
| DE | 1 806 402 A1 | 6/1969 | |
| DE | 31 14 403 A | 10/1982 | |
| DE | 198 35 704 A1 | 2/2000 | |
| DE | 100 37 393 A1 | 2/2002 | |
| DE | 102013101801 A1 * | 8/2014 | B29C 70/34 |
| DE | 102013210423 A1 * | 12/2014 | H01R 13/58 |
| DE | 102014011990 A1 * | 3/2015 | B60R 16/0215 |
| DE | 102014213973 A1 * | 1/2016 | H02K 11/33 |
| DE | 102017219229 A1 * | 5/2018 | B60R 16/0215 |
| DE | 102018106734 A1 * | 9/2018 | B29C 48/0019 |
| DE | 10 2018 129 331 A1 | 6/2019 | |
| DE | 102018213518 A1 * | 2/2020 | B60R 16/0222 |
| EP | 0535712 A2 * | 4/1993 | |
| EP | 0791996 * | 8/1997 | |
| FR | 2936660 A1 * | 4/2010 | B60R 16/0207 |
| FR | 3059625 A1 * | 6/2018 | B60R 16/0215 |
| GB | 2497897 A | 6/2013 | |
| KR | 200413782 Y1 * | 4/2006 | |
| WO | WO-9500736 A1 * | 1/1995 | A46B 3/18 |
| WO | WO-0013940 A1 * | 3/2000 | B60R 16/02 |
| WO | WO-2016060251 A * | 4/2016 | B60R 16/02 |
| WO | WO-2020030400 A1 * | 2/2020 | B60R 16/0222 |

OTHER PUBLICATIONS

German Search Report issued in German application No. 10 2018 213 518.5 dated Aug. 27, 2019, with Statement of Relevancy (Eight (8) pages).

* cited by examiner

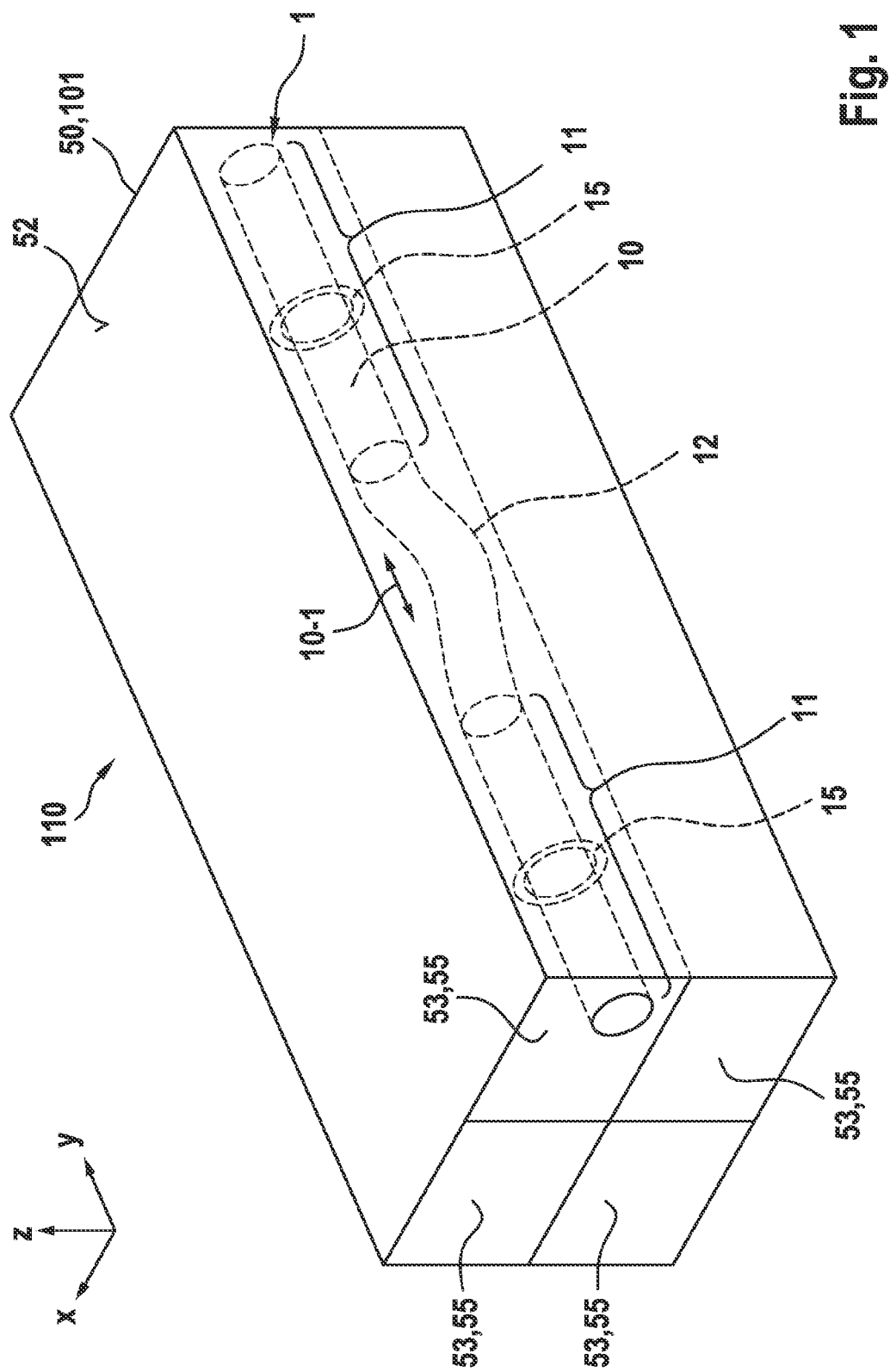

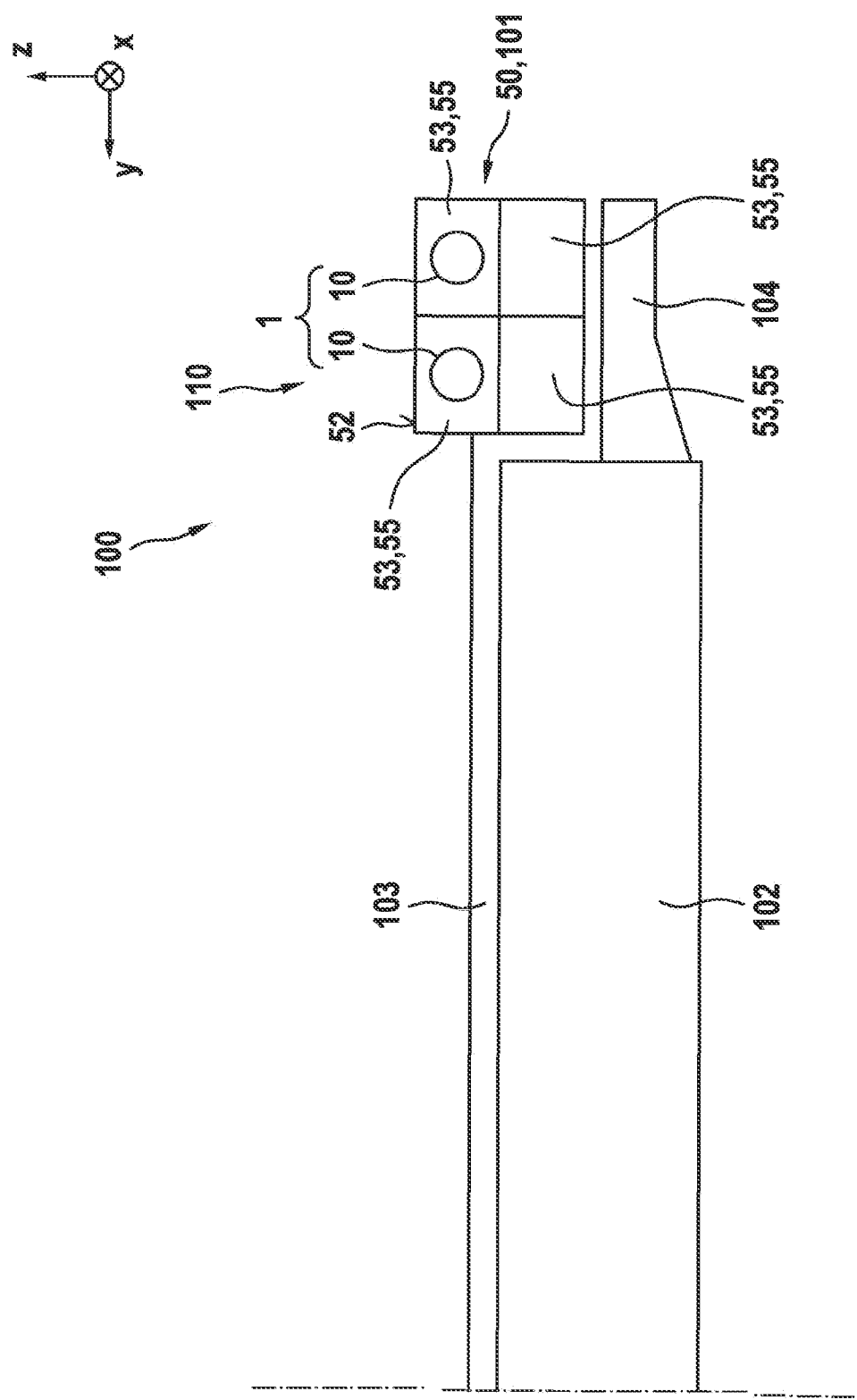

COMPONENT ARRANGEMENT WITH A LINE THAT HAS RIGID AND FLEXIBLE SECTIONS

BACKGROUND AND SUMMARY OF THE INVENTION

The present invention relates to a line arrangement, to a component arrangement, and to a working device, and in particular to a vehicle.

Line arrangements for guaranteeing an exchange of signals or the transmission of power for supplying apparatuses are required in many sectors of industry and in particular in the automotive sector. The corresponding line arrangements herein are often installed along existing components of a component arrangement, for example in the external region of body structures or structural elements, because an integration into cavities would be too complex in terms of assembly and maintenance.

The invention is based on the object of specifying a line arrangement, a component arrangement, and a working device, and in particular a vehicle, in which an integration of lines in the interior of components becomes possible with simple means and a reduced complexity in terms of assembly and a reduced requirement in terms of installation space.

According to a first aspect of the present invention, a line arrangement for assembling and for at least partially accommodating in and/or for routing through the interior of a component, in particular a chamber of a body component of a vehicle, is achieved, the line arrangement having at least one line which is configured so as to be pliable and to have a plurality of rigid segments and flexible connection elements that connect the segments. On account of these measures, assembling a line in the interior of the component is enabled so as to be as simple and stable as possible such that this procedure can advantageously be used with comparatively little risk in the production and the new design of component arrangements.

According to one preferred design embodiment of the line arrangement according to the invention, further stabilizing when assembling and operating a line arrangement assembled in such a manner results when, for fixing and/or supporting the line in the interior of the component, at least one assembly element, which, in the assembled state in the interior of the component, is specified for being supported in relation to an internal wall of the component is configured.

It is furthermore advantageous herein when, according to another exemplary embodiment of the line arrangement according to the invention, a respective assembly element is configured as a ring on an external circumference of the line and/or is configured on the external circumference of a rigid segment.

A particularly reliable operation is established in the application of the line arrangement according to the invention when the assembly element is configured as a vibration-damping element, possesses an elastic construction, and/or is configured with or from rubber, plastics material and/or a combination of rubber and plastics material.

In another alternative or additional embodiment of the line arrangement according to the invention, a respective connection element in the assembled state in the interior of the component in geometric terms is specified for being supported in relation to an internal wall of the component.

It is in particular conceivable that a respective connection element is configured as part of the line and/or in the direction of main extent 10-1 of the line 10 has an encircling helical shape.

Further stabilizing of the assembly and of the operation of the line arrangement according to the invention is established when at least one assembly element is configured for fixing the line on the construction element at that end of the line that is proximal to the underlying component, and is specified for attaching in a form-fitting manner and/or for mounting in a fixed/floating manner.

According to a further aspect of the present invention, a component arrangement which is configured having a component which has a housing surrounding an interior, and having a line arrangement designed according to the invention is also specified, wherein the line of the line arrangement is at least partially accommodated and assembled in the interior of the component and/or routed through the interior of the component.

In one advantageous refinement of the component arrangement according to the invention, the component is configured as a body component of a working device, and in particular of a vehicle, in the manner of a chassis beam in a single-chamber construction mode and/or a multi-chamber construction mode.

Alternatively or additionally, the line is configured as a supply line between a battery module, in particular a rechargeable flat battery, and an apparatus to be supplied of a working device, and in particular of a vehicle.

Furthermore achieved by the present invention is also a working device which can be configured as a vehicle or a motor vehicle, for example, and has a component arrangement designed according to the invention.

Further details, features, and advantages of the invention are derived from the description hereunder and from the Figures.

BRIEF DESCRIPTION OF THE DRAWINGS

FIG. 1, in a perspective and partially sectional lateral view, shows an embodiment of the component arrangement according to the invention while using a line arrangement which is designed according to the concept according to the invention; and FIG. 2, in a schematic and sectional front view, shows a design embodiment of the working device according to the invention w % bile using a component arrangement designed according to the invention having a line arrangement according to the invention.

DETAILED DESCRIPTION OF THE DRAWINGS

Exemplary embodiments and the technical background of the invention will be described in detail hereunder with reference to FIGS. 1 and 2. The same and the equivalent elements and components, or elements and components of equivalent function, are identified by the same reference signs. The detailed description of the identified elements and components is not repeated in each case when the latter are present.

The features illustrated and further properties can be isolated from one another in any form, and be combined with one another in an arbitrary manner, without departing from the core concept of the invention.

FIG. 1 in a perspective and partially sectional lateral view shows an embodiment of the component arrangement 110 according to the invention while using a line arrangement 10 which is designed according to the concept according to the invention.

The component arrangement 110 shown in FIG. 1 is composed of a component 50 in the manner of a longitudinal chassis beam 101 of a vehicle body in a multi-chamber construction mode having a plurality of chambers 53 which are surrounded and formed by a housing 52 of the component 50 and which thus form the interior 55 of the component 50.

A design embodiment of the line arrangement 1 according to the invention is assembled in one of the chambers 53 of the component 50, and the line arrangement 1 along the x-direction in terms of the xyz tripod as the external coordinate system extends through the provided chamber 53 in the longitudinal extension of the latter.

The line arrangement 1 is composed of a line 10 having a plurality of, here two, rigid segments 11 which are connected to one another by a flexible connection element 12.

One assembly element 15 in the manner of a ring is in each case configured on the external circumference of the rigid segments 11, the ring by way of the external circumference thereof being supported in a flexible manner on the internal faces of the walls of the housing 52 of the component 50 that form the chamber 53 in order to mount the line 10 in a vibration-damped manner in the interior 55 of the component 50.

FIG. 2 in a schematic and sectional front view shows a design embodiment of the working device 100 according to the invention while using a component arrangement 110 designed according to the invention, having a line arrangement 1 according to the invention in a chamber 53 of a component 50.

The component arrangement 110 may have the structure illustrated in FIG. 1, but this is not mandatory.

The working device 100 illustrated in FIG. 2, for example in the form of a vehicle, is furthermore formed by further frame elements 103 and 104 which are attached to the chassis beam 101. The frame element 103 on the lower side thereof supports, for example, a battery module of an electric vehicle or of a hybrid vehicle as a design embodiment of the working device 100 according to the invention. In this case, the line 10 of the line arrangement 1 can be formed by a power supply line which transmits electric power from the battery module 102 to an apparatus which is to be supplied with power.

However, other concepts of application are also conceivable, for example with a view to signal lines or the like. Furthermore conceivable are also applications of the invention in which the component 50 is not formed by a body element, for example by a chassis beam, but by a housing, for example also by a housing of a battery module or the like.

The concept according to the invention can thus be applied wherever a line is to be routed through a cavity or a chamber of a component, and a simple, stable and reliable assembly in association with an ideally low level of technical and labor-related complexity is important.

These and further features and properties of the present invention will be further explained by means of the following presentation.

The integration of the line routing, for example for coolant or electric current, represents a great challenge, in particular in the case of battery-powered electric vehicles, the latter understood to be a working device 100, having a large high-voltage flat battery as the battery module 102 in the underfloor region.

Lines 10 are conventionally routed on the external structure of the body or on as well as in the HVS housing.

This leads to an additional installation space requirement, and in the case of the body structure to an effective enlargement of the longitudinal chassis beam structures. This can compromise the comfortable access to a vehicle, for example. The installation space for battery cells is reduced in the case of the lines being routed in the HVS housing.

The integration of the lines can take place in a manner that is neutral in terms of the installation space by integrating the line routing into the body structure, for example laterally in the longitudinal chassis beam, or in the sill. The lines 10 can be routed in a chamber 53 of a multi-chamber profile, for example. With a view to ensuring the ease of assembly, the line 10 is embodied so as to be pliable and from a plurality of rigid segments 11 having flexible connection pieces 12 therebetween.

Vibration-damping elements 15, for example from rubber, are in particular attached in order for the line 10 to be fixed in the chamber 53. The flexible connection pieces 12 in geometric terms can furthermore be embodied such that the flexible connection pieces 12, for example on account of a helical shape, are supported on the internal walls in the profile chamber 53. This shape can optionally be assumed by the line only in the final installed position, for example by collapsing the line 10.

Fixing by further elements, for example in a form-fitting manner, can take place at the ends of the longitudinal chassis beam chamber 53, wherein a variation of the length and/or a displacement of the line 10 is possible by way of a fixed/floating mounting.

The invention results in advantages such as a reduction of the installation space requirement for the routing of the lines on account of the structurally integrated approach, an improvement of the installation space for battery cells, and thus m terms of the range of the vehicle. Improvements in terms of the access for occupants are also possible.

LIST OF REFERENCE CHARACTERS

1 Line arrangement
10 Line
10-1 Direction of main extent of the line 10
11 (Rigid) segment
12 (Flexible) connection element, transition element
15 Assembly element
50 Component
52 Housing
53 Chamber
55 Interior
100 Working device, vehicle
101 Longitudinal chassis beam
102 Battery module, rechargeable flat battery
103 Frame element
104 Frame element
110 Component arrangement
x Spatial direction
y Spatial direction
z Spatial direction

What is claimed is:

1. A component arrangement, comprising:
a component which has a housing surrounding an interior;
a line comprising a first rigid segment and a second rigid segment and a flexible connection element that connects the first rigid segment and the second rigid segment;
wherein the line is disposed in the interior of the component and is assembled in the interior of the component and is routed through the interior of the component; and
an assembly element, wherein an entirety of the assembly element is disposed in the interior of the component, wherein the assembly element is a ring, wherein an internal circumference of the ring is disposed on an external circumference of the line, and wherein an external circumference of the ring is supported on an internal wall of the component;

wherein the component is a chassis beam of a vehicle in a single-chamber construction or in a multi-chamber construction; and wherein the line is a supply line between a battery module and a working device of the vehicle.

2. The component arrangement according to claim 1, wherein the assembly element is a vibration-damping element that has an elastic construction.

3. The component arrangement according to claim 1, wherein the flexible connection element in an assembled state in the interior of the component is supported in relation to the internal wall of the component.

4. A motor vehicle, comprising:

the component arrangement according to claim 1.

\* \* \* \* \*